Dec. 30, 1941.  A. H. SCHUTTE  2,268,535
METHOD OF EFFECTING CATALYSIS
Filed Nov. 1, 1939
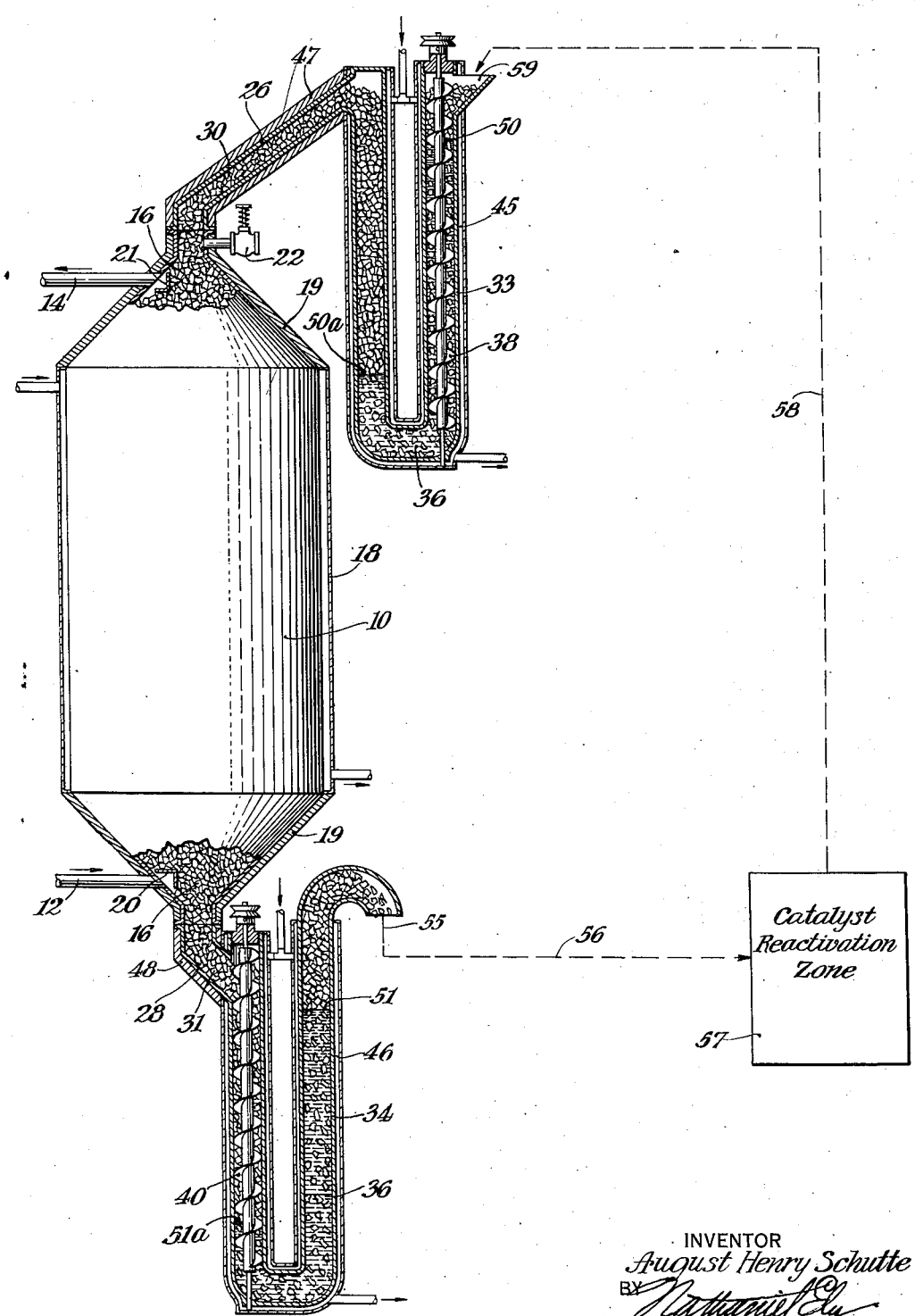
INVENTOR
*August Henry Schutte*
BY
ATTORNEY Patented Dec. 30, 1941

2,268,535

UNITED STATES PATENT OFFICE 2,268,535

METHOD OF EFFECTING CATALYSIS

August Henry Schutte, Tuckahoe, N. Y., assignor to The Lummus Company, New York, N. Y., a corporation of Delaware Application November 1, 1939, Serial No. 302,278

5 Claims. (Cl. 196—52)

This invention relates to the handling of catalytic materials in catalytic processes. In particular, this invention relates to a method of sealing a catalyst chamber of the type through which the catalyst is moved in a continuous stream so that leakage of the fluid material undergoing reaction within the chamber is prevented at the points of introduction and removal of the catalyst therefrom and so that both the catalytic reaction and the flow of the catalyst can be carried out continuously.

The use of a catalyst to expedite a chemical reaction is old and well-known. The catalyst may be employed in various ways; for example, the catalyst may be admixed with the reacting materials and the mixture then passed through a reaction zone, or the catalyst may be placed in a suitable chamber and the reactants in vapor or liquid form caused to pass over the catalyst.

My invention is concerned with that method in which both the catalyst and the reacting materials are caused to continuously flow in the same or in opposite directions through a reaction zone. This method has the obvious advantage that fresh catalyst is continuously introduced into the reaction zone and contaminated catalyst is continuously removed therefrom to be reactivated externally. Duplication of equipment and use of complicated apparatus to control operating conditions during the reactivation of the catalyst are not necessary.

Since this particular method is usually employed at pressures other than atmospheric, it is necessary, if the loss of reacting materials or contamination thereof, as well as the formation of explosive mixtures, is to be avoided, that means be provided, if the reaction zone is under pressure, to prevent the passage of the reacting materials outwardly therefrom or, if the reaction zone is under vacuum, to prevent the passage of air and the like inwardly thereto through the conduits by which the catalyst is fed to and removed from the reaction zone. Furthermore, it is desirable that the catalyst be continuously fed to and removed from the reaction zone at a substantially constant rate without variation of the pressure maintained therein.

One of the objects of my invention is to provide a method of sealing a catalyst chamber through which both the reacting materials and the catalyst flow in continuous streams whereby leakage or contamination of the reacting materials is prevented and the catalyst is continuously fed to and removed from the chamber at a substantially constant rate without variation of the pressure maintained therein.

Further objects and advantages of my invention will be apparent from the description of a preferred form of embodiment thereof taken in connection with the accompanying drawing, which is a diagrammatic drawing of an apparatus suitable for carrying out the invention.

For convenience my invention will be described in connection with a chamber in which the catalyst and the reacting materials flow in opposite directions although my invention is equally applicable to a chamber in which the catalyst and the reacting materials flow in the same direction.

The drawing illustrates a preferred type of apparatus which is suitable for carrying out the process. The apparatus includes a catalyst chamber 10 which is provided with conduits 12 and 14 for the introduction thereto and withdrawal therefrom, respectively, of the reacting materials and the reacted products which, for purpose of example, may be hydrocarbons, the chemical composition of which is to be changed by contact with a catalyst generally indicated at 16. Jacket 18 may be provided so that a heating or a cooling medium may be circulated about chamber 10. Those parts of the chamber not surrounded by the jacket may be insulated in a suitable fashion as at 19. Baffle means 20 are provided to evenly distribute the incoming stream of reacting materials through the catalyst; similar means are provided at 21 to separate the reactants from the catalyst particles. A safety valve 22 may be provided if the reaction in chamber 10 is conducted under a pressure in excess of atmospheric.

Catalyst particles 16 usually occupy substantially all the available space in chamber 10. Their size is preferably such that there is sufficient free space between the catalyst particles so that the reacting materials can flow through the chamber with a reasonably low pressure drop. The catalyst should be granular in form so that it may be easily handled in the catalyst chamber and is preferably of a large mesh size in the range of 0.1 to 0.5" to provide adequate surface area without excessive pressure drop. No specific limit is necessary for this invention, although it will be appreciated that operation of the catalyst chamber is made difficult with powdered catalysts because of the slow rate at which the catalyst settles and because of its tendency to pack once it has settled sufficiently.

It is a feature of my invention that the particles are kept moving through the chamber 10 in a continuous stream without any variation in the pressure maintained therein by the constant feeding of fresh catalyst through feed conduit 26 and the constant withdrawal of spent catalyst through discharge conduit 28. The rates of feeding and withdrawal are preferably adjusted so that the quantity of catalytic material within chamber 10 is maintained practically constant. It will be understood that conduits 26 and 28 will both be substantially completely filled with catalyst as shown at 30 and 31.

The feed and discharge conduits 26 and 28 extend to sealing devices generally indicated at 33 and 34 which are preferably of U-shape. These vessels 33 and 34 may be considered to be extensions of conduits 26 and 28 respectively and are suitably provided with means to propel the catalyst through the seal, which preferably comprises a liquid indicated at 36, maintained therein. The propelling means may be screw conveyors 38 and 40 so that fresh catalyst can be continuously fed to chamber 10 and spent catalyst continuously removed therefrom.

The liquid used to effect the seal should have certain characteristics and should be selected with regard to the particular operating conditions and the particular reaction. The particular sealing liquid should have a freezing point sufficiently below and a boiling point sufficiently above the reaction temperature so that slight temperature variations within the catalyst chamber will not alter the physical state of the sealing liquid. It is desirable to use a liquid having a specific gravity such that the necessary liquid head to balance the differential pressure can be maintained within a reasonable height. The specific gravity of the liquid should preferably be greater than that of the catalyst so that the catalyst does not accumulate at the low point of the seal. The liquid should have a high surface tension so that it does not wet or adhere to the catalyst particles in any way, and it should not react chemically with the catalyst; otherwise, the catalytic reaction may not be satisfactorily carried out, or the activity of the catalyst may be adversely affected. It is also preferable that gases dissolve in the liquid to a negligible extent.

The liquid seal may be made in any desired shape; whatever shape is used, however, the available liquid head therein must be sufficiently greater than the pressure differential between the catalyst chamber and the external atmosphere so that the liquid seal will not be broken. Preferably, the seal is made in such a shape that the catalyst propelling means may be readily combined therewith.

Vessels 33 and 34 are preferably provided with jackets as at 45 and 46, to which a heating medium is supplied, so that the desired temperature may be maintained. The feeding and discharging conduits 26 and 28 may be conveniently insulated as at 47 and 48.

The height of liquid in the vertical legs of vessels 45 and 46, indicated at 50 and 50a and 51 and 51a respectively, is maintained as low as possible in accordance with the specific gravity of the liquid and the existing differential pressure. The liquid level at 50a and at 51a is of such a height, however, that any slight increase in the operating pressure in chamber 10 does not force the liquid entirely out of the vertical leg. In addition, vessels 45 and 46 contain sufficient liquid so that, if a vacuum is applied to chamber 10, the seal will not be broken.

A system for reactivating the spent catalyst removed from chamber 10 has been shown diagrammatically. In this construction, the spent catalyst may be withdrawn at 55 and conveyed as by a suitable conveyor represented by line 56 to a catalyst reactivation zone indicated at 57 in which the contaminated catalyst is reactivated. The reactivated catalyst, preferably at a temperature approximately the reaction temperature, is then conveyed as by a conveyor indicated by line 58 to hopper 59, where it is picked up by the feed screw conveyor 38.

An appropriate heat recovery installation (not shown) may be provided at 57. In this way the heat generated during the catalyst reactivation may be transferred to the heating medium circulated through the jackets surrounding chamber 10 and vessels 33 and 34. The heating medium may comprise high pressure superheated steam, diphenyl, mercury, or the like.

New catalyst may be continuously introduced to the system at 59 irrespective of the reactivation steps; and spent catalyst may be continuously removed from the system at 55 and discarded or used for some other purpose if reactivation and continuous recycling is undesirable. If the fresh catalyst enters at 59 in a relatively cold condition, the liquid seal, maintained substantially at the reaction temperature, serves to preheat the catalyst. Thereby, temperature conditions throughout the apparatus are maintained substantially constant.

Molten metals have been found especially suitable as the liquid sealing agent since most catalytic reactions must be carried out at elevated temperatures. Because of their higher specific gravity, molten metals such as lead are particularly to be preferred when the reaction requires a pressure substantially in excess of atmospheric. Normally liquid materials such as mercury, molten alloys, or the like, may also be used.

Molten lead is found most satisfactory for use with bauxite and similar clay-like catalysts often used in petroleum hydrocarbon reactions. It has a specific gravity such that excessive heights of liquid are not required to withstand operating pressures below about 100 pounds per square inch gauge. Furthermore, it has a high surface tension so that it does not wet the catalyst used; it does not react chemically with these catalysts; and it does not materially vaporize at reaction temperatures in the range of 800–1,000° F. Under such conditions, the catalytic dehydrogenation of petroleum hydrocarbons may be successfully carried out.

It will be appreciated that my process is equally applicable to a reaction carried out under a vacuum. In this case the depth of liquid in the respective legs of the U-shaped vessels is changed so that the greater depth of liquid is in the leg attached to the chamber. Operation of the process and apparatus is not otherwise affected.

Although I have described a preferred form of embodiment of my invention, I am aware that modifications may be made thereto, and I, therefore, desire a broad interpretation of my invention within the scope and spirit of the description herein and of the claims appended hereinafter.

I claim:

1. In the method of catalytically treating petroleum hydrocarbons with a catalyst in a catalyst chamber of the type through which the catalyst and the reactants are moved in continuous streams, the steps comprising maintaining said chamber under the desired pressure and temperature conditions, continuously introducing hydrocarbons thereto and withdrawing reacted hydrocarbons therefrom, continuously introducing fresh catalyst thereto and removing spent catalyst therefrom, sealing the catalyst chamber against leakage at the points of catalyst introduction and removal by maintaining at each of said points a column of molten lead having a head sufficient to balance the differential pressure between the chamber and the external atmosphere, and passing the catalyst through the column of molten lead at a substantially constant rate.

2. The method of catalytically effecting a chemical reaction which comprises continuously passing fluid reactants and catalyst through a reaction chamber, maintaining predetermined pressure and temperature conditions in said chamber, sealing the chamber against pressure leakage at the points of introduction and withdrawal of the catalyst by maintaining at each of said points a column of a liquid substantially non-volatile under the conditions of operation and substantially non-wetting and non-reactive with respect to the catalyst, said column having a head sufficient to balance the differential pressure between the chamber and the external atmosphere, and said catalyst being passed through the liquid seal.

3. In the method of catalytically effecting a chemical reaction wherein fluid reactants and catalyst are passed through a reaction chamber in continuous streams and wherein predetermined pressure and temperature conditions are substantially maintained in said chamber, the step of sealing the chamber against pressure leakage at the points of introduction and withdrawal of the catalyst, which comprises maintaining at each of said points a column of a liquid which is substantially non-volatile under the conditions of operation and substantially non-wetting and non-reactive with respect to the catalyst and passing the catalyst through said liquid column, said column having a head sufficient to balance the differential pressure between the chamber and the external atmosphere.

4. The method of sealing a chamber in which a chemical reaction is being effected at an elevated temperature and through which a mass of granular catalyst is being continuously fed simultaneously with the continuous passage therethrough of vaporous reactants under a pressure different from atmospheric, which comprises passing the granular catalyst through a column of molten metal at the points of catalyst introduction and withdrawal, said column having a head effective to balance the differential in pressure between the chamber and the external atmosphere, said molten metal being substantially chemically inert and non-wetting with respect to the granular catalyst and being substantially non-volatile under the conditions of operation.

5. The method of continuously converting hydrocarbons in the presence of a bauxite catalyst, which comprises continuously passing hydrocarbon vapors through a reaction chamber, continuously passing the bauxite catalyst through said chamber, maintaining said chamber at a predetermined temperature and pressure, and maintaining at the points of introduction and withdrawal of the catalyst a column of molten lead having a head sufficient to balance the differential pressure between the chamber and the external atmosphere, and passing said catalyst through said lead columns into and out of said chamber, said lead being substantially non-wetting and non-reactive with respect to the catalyst and being substantially non-volatile under the conditions of operation.

AUGUST HENRY SCHUTTE.